(12) United States Patent
Imamura

(10) Patent No.: US 11,008,487 B2
(45) Date of Patent: May 18, 2021

(54) THERMOSET ADHESIVE, AUTOMOTIVE COMPONENT USING THERMOSET ADHESIVE, AND METHOD OF MANUFACTURING SAME

(71) Applicant: 3M INNOVATIVE PROPERTIES COMPANY, St. Paul, MN (US)

(72) Inventor: Kengo Imamura, Ebina (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 188 days.

(21) Appl. No.: 16/253,376

(22) Filed: Jan. 22, 2019

(65) Prior Publication Data

US 2019/0153275 A1 May 23, 2019

Related U.S. Application Data

(62) Division of application No. 14/439,678, filed as application No. PCT/US2013/068368 on Nov. 5, 2013, now Pat. No. 10,316,225.

(30) Foreign Application Priority Data

Nov. 5, 2012 (JP) .............................. JP2012-243718

(51) Int. Cl.
| | |
|---|---|
| *C09J 163/00* | (2006.01) |
| *C09J 5/06* | (2006.01) |
| *C08K 7/22* | (2006.01) |
| *C08L 21/00* | (2006.01) |
| *B32B 7/02* | (2019.01) |
| *B32B 7/12* | (2006.01) |
| *B32B 15/04* | (2006.01) |
| *B32B 37/06* | (2006.01) |
| *B32B 37/12* | (2006.01) |

(52) U.S. Cl.
CPC .............. *C09J 163/00* (2013.01); *B32B 7/02* (2013.01); *B32B 7/12* (2013.01); *B32B 15/043* (2013.01); *B32B 37/06* (2013.01); *B32B 37/12* (2013.01); *C08K 7/22* (2013.01); *C08L 21/00* (2013.01); *C09J 5/06* (2013.01); *B32B 2037/1253* (2013.01); *B32B 2255/06* (2013.01); *B32B 2255/26* (2013.01); *B32B 2605/08* (2013.01); *C09J 2301/412* (2020.08); *C09J 2400/163* (2013.01); *C09J 2421/00* (2013.01); *C09J 2463/00* (2013.01); *Y10T 428/24942* (2015.01); *Y10T 428/25* (2015.01)

(58) Field of Classification Search
CPC .......... C09J 163/00–10; C09J 2301/412; C09J 121/00; C08K 7/22; B32B 15/043; B32B 7/02; B32B 7/12; C08L 63/00–10
See application file for complete search history.

(56) References Cited

U.S. PATENT DOCUMENTS

| | | |
|---|---|---|
| 5,086,088 A | 2/1992 | Kitano |
| 2009/0011216 A1 | 1/2009 | Suzuki |
| 2009/0176903 A1 | 7/2009 | Muenz |
| 2010/0166619 A1 | 7/2010 | Dietz |
| 2012/0207925 A1 | 8/2012 | Hornung |
| 2013/0206333 A1 | 8/2013 | Czaplicki |

FOREIGN PATENT DOCUMENTS

| | | |
|---|---|---|
| JP | 2001064481 | 3/2001 |
| JP | 3941409 | 10/2002 |
| JP | 2004-323639 | 11/2004 |
| JP | 2010090299 | 4/2010 |
| JP | 2010-270198 | 12/2010 |
| WO | WO 2008/016889 | 2/2008 |
| WO | WO 2009/124709 | 10/2009 |
| WO | WO 2011/056357 | 5/2011 |

OTHER PUBLICATIONS

International Search Report for PCT International Application No. PCT/US2013/068368, dated Jun. 18, 2014, 4 pgs.
Product Specification for Expancel Microspheres: Expancel DU, Nov. 2011.

*Primary Examiner* — Kregg T Brooks
(74) *Attorney, Agent, or Firm* — Harold C. Knecht, III

(57) ABSTRACT

A thermoset adhesive for bonding two materials having different linear expansion coefficients with reduced warping and without spaces being formed therebetween. The thermoset adhesive of the present invention comprises an epoxy resin, a core-shell rubber, thermally expansive microparticles, and a curing agent. The thermally expansive microparticles can have at least one or any combination of an average particle size of from 9 to 19 μm, an expansion initiation temperature of from 70 to 100° C., and a maximum expansion temperature of from 110 to 135° C.

18 Claims, No Drawings

THERMOSET ADHESIVE, AUTOMOTIVE COMPONENT USING THERMOSET ADHESIVE, AND METHOD OF MANUFACTURING SAME

FIELD OF THE INVENTION

The present disclosure relates to a thermoset adhesive, an automotive component using the thermoset adhesive, and a method of manufacturing the same, and more specifically, to a thermoset adhesive used to bond heterogeneous materials, an automotive component comprising heterogeneous materials bonded using the thermoset adhesive, and a method of manufacturing the same.

BACKGROUND ART

There is a constant demand for the use of aluminum, plastic, and other lighter materials for automotive components in order to reduce the weight of these parts for the sake of improving fuel efficiency, reducing carbon dioxide emissions, and so forth. For example, the ceiling parts (roofs) of automobiles are generally made of iron, and attempts have been made to manufacture these roofs from aluminum. Meanwhile, because the body part to which the roof is mounted is made of iron, if an aluminum roof and an iron body part are brought into direct contact and bonded in place via rivets, nuts and bolts, or other mechanical means, the aluminum is corroded by electric corrosion occurring between the aluminum and the iron. Thus, when coupling aluminum and iron, it is necessary to dispose a spacer, such as a rubber sheet, between the aluminum and the iron to electrically insulate these materials.

One-pack thermoset adhesives, also known as structural adhesives, are used in the manufacture of automotive components. If such an adhesive is used in addition to rivets or nuts and bolts to couple a roof and a body part, the roof and the body part can be more strongly coupled. Because adhesives are ordinarily insulating in nature, the use of an adhesive to couple an aluminum roof and an iron body part in addition to mechanical joining will insulate these materials from each other, preventing corrosion of the aluminum due to electric corrosion. By applying an adhesive to the roof and/or body part, fixing the roof and body part in place using rivets or nuts and bolts, and subsequently performing electrodeposition and heating/drying, the heat from the heating/drying process can be used to cure the adhesive. However, when coupling the aluminum roof and the iron body part, differences in the linear expansion coefficients leads to the formation of gaps between the aluminum and the iron during the heating/drying process when a high temperature (for example, about 170-200° C.) is reached due to warping of these materials, thus forming spaces (voids) within the interior of the cured adhesive layer, or between the adhesive layer and the aluminum or iron. Moisture penetrating through voids between the aluminum and the iron carries the risk of corroding the aluminum and/or iron.

Japanese Unexamined Patent Application Publication No. 2002-284045A discloses a "method of joining automotive components made of heterogeneous metals, wherein an electrical insulating sealant which is adhesive to one mating surface of surfaces and is weakly- or non-adhesive to the other mating surface, is applied to the mating surfaces where one member and another member are joined, and the two components are mechanically joined". Japanese Unexamined Patent Application Publication No. 2004-323639A discloses "a bonded structure for adherends exhibiting different levels of thermal expansion in which adherends exhibiting different levels of thermal expansion are bonded via an adhesive layer, wherein the adhesive layer has a two-layered structure, at least one layer of which comprises an epoxy resin having at least two epoxy groups as a primary ingredient and is formed from a flexible epoxy composition that is flexible when cured".

SUMMARY OF THE INVENTION

The present disclosure can provide a thermoset adhesive allowing two materials having different linear expansion coefficients, such as aluminum and iron, to be bonded with reduced warping and without spaces being formed therebetween. The present disclosure can also provide an automotive component comprising heterogeneous materials bonded using said thermoset adhesive, and a method of manufacturing the same.

In accordance with one aspect of the present invention, a thermoset adhesive is provided that comprises an epoxy resin, a core-shell rubber, thermally expansive microparticles, and a hardening agent. It can be desirable for the thermally expansive microparticles to have at least one, or any combination of, an average particle size of from 9 to 19 µm, an expansion initiation temperature of from 70 to 100° C., and a maximum expansion temperature of from 110 to 135° C.

In accordance with another aspect of the present invention, a method of manufacturing an automotive component is provided. The method comprises: preparing a first plate-shaped member and a second plate-shaped member; applying a thermoset adhesive to a surface of the first plate-shaped member, the second plate-shaped member, or both. The thermoset adhesive comprises an epoxy resin, a core-shell rubber, thermally expansive microparticles, and a hardening agent. It can be desirable for the thermally expansive microparticles to have at least one, or any combination of, an average particle size of from 9 to 19 µm, an expansion initiation temperature of from 70 to 100° C., and a maximum expansion temperature of from 110 to 135° C. The method further comprises layering the first plate-shaped member, the thermoset adhesive, and the second plate-shaped member in that order; and heating and curing the thermoset adhesive to bond the first plate-shaped member and the second plate-shaped member using the cured thermoset adhesive. It is desirable for the first plate-shaped member to have a linear expansion coefficient different from a linear expansion coefficient of the second plate-shaped member.

In accordance with yet another aspect of the present invention, an automotive component is provided, where the automotive component comprises a first plate-shaped member, a second plate-shaped member, and the cured thermoset adhesive disposed between the first plate-shaped member and the second plate-shaped member. The first plate-shaped member is bonded to the second plate-shaped member using the cured thermoset adhesive. It is desirable for the first plate-shaped member to have a linear expansion coefficient different from a linear expansion coefficient of the second plate-shaped member.

When heterogeneous materials having different linear expansion coefficients are heated, the thermally expansive microparticles contained in the thermoset adhesive according to one embodiment of the present invention can expand the adhesive at a comparatively low temperature before gaps between the materials arising from the difference in linear expansion coefficient therebetween grow large. The expanded adhesive can be made capable of curing before the maximum heating temperature is reached, thereby bonding the materials. Gaps forming between the materials during the heating process can thus be filled by the expanded adhesive, allowing the materials to be bonded with little warping and with no spaces being formed therebetween.

In another embodiment, an automotive component can be manufactured in which such a thermoset adhesive is used to bond heterogeneous materials with little warping and with no spaces being formed therebetween. The thermoset adhesive of the present disclosure can be especially preferably used to couple an aluminum-containing component and an iron-containing component when manufacturing the automotive component.

The foregoing detailed description should not be considered a complete disclosure of all embodiments of the present invention, or of all advantages related to the present invention.

EXEMPLARY EMBODIMENTS FOR CARRYING OUT THE INVENTION

A detailed description for the purpose of illustrating representative embodiments of the present invention is given below, but these embodiments should not be construed as limiting the present invention.

A thermoset adhesive according to one embodiment of the present disclosure comprises an epoxy resin, a core-shell rubber, thermally expansive microparticles, and a curing agent. The thermally expansive microparticles have an average particle size of from 9 to 19 μm, an expansion initiation temperature of from 70 to 100° C., and a maximum expansion temperature of from 110 to 135° C.

The epoxy resin is comprised within the thermoset adhesive as a thermoset ingredient. The epoxy resin is liquid, semi-solid, or solid at normal temperatures (25° C.), and encompasses low-viscosity epoxy compounds also referred to as reactive diluents or reactive plasticizers. In general, a di- or polyphenol, a di- or polyglycidyl ether of an aliphatic or cycloaliphatic hydroxyl compound, a glycidyl ester of an aliphatic, cycloaliphatic, or aromatic carboxylic acid, or the like can be used as the epoxy resin. A mixture of two or more types of epoxy resin may also be used as the epoxy resin.

Non-limiting examples of acceptable epoxy resins include: bisphenol epoxy resins such as bisphenol A epoxy resin, dimer acid-modified bisphenol A epoxy resin, and bisphenol F epoxy resin; epoxy resins with an aliphatic backbone such as hexanediol diglycidyl ether; glycidyl amine epoxy resins such as p-aminophenol triglycidyl ether; novolac epoxy resins such as phenol novolac epoxy resin and creosol novolac epoxy resin; brominated epoxy resins; cycloaliphatic epoxy resins; epoxidized polyethers such as polyethylene glycol glycidyl ether and polypropylene glycol glycidyl ether; glycidyl esters such as glycidyl neodecanoate; and mixtures thereof.

The epoxy equivalent weight of the epoxy resin can generally be roughly 100 g/equivalent weight or more, roughly 150 g/equivalent weight or more, or roughly 170 g/equivalent weight or more, and roughly 250 g/equivalent weight or less, roughly 230 g/equivalent weight or less, or roughly 220 g/equivalent weight or less. If a mixture or two or more types of epoxy resin is used, the epoxy equivalent weight is that of the mixture.

The number average molecular weight of the epoxy resin can generally be roughly 100 or more, or roughly 200 or more, and roughly 2,000 or less, roughly 1,000 or less, or roughly 700 or less in terms of standard polystyrene. The average epoxy functionality, i.e., the average number of polymerizable epoxy groups per molecule, of epoxy resins other than reactive diluents and reactive plasticizers is at least 2, and is preferably from 2 to 4. Reactive diluents and reactive plasticizers ordinarily have one polymerizable epoxy group per molecule.

An amount of epoxy resin equivalent to roughly 20 mass % or more, roughly 25 mass % or more, or roughly 30 mass % or more, and roughly 60 mass % or less, roughly 55 mass % or less, or roughly 50 mass % or less of the thermoset adhesive can be used.

The core-shell rubber is a composite material having different materials for the inner core part and the outer shell part, and is included in the thermoset adhesive as a reinforcing agent. In the present disclosure, a core-shell rubber in which the glass transition temperature (Tg) of the shell part is higher than the Tg of the core part can be used; for example, the materials of the core part and the shell part can be selected so that the Tg of the core part is roughly −110° C. or higher and roughly −30° C. or less, and the Tg of the shell part is roughly 0° C. or higher and roughly 200° C. or less. In the present disclosure, the Tg of the material for the core part and the material for the shell part is defined as the temperature for the peak value of tan δ as measured for dynamic visco-elasticity. Using a core-shell rubber in the thermoset adhesive causes the core part, which has a low Tg, to function as a stress concentration point, thereby imparting the cured thermoset adhesive with flexibility while allowing undesirable aggregation of the core-shell rubber in the shell part to be controlled and the core-shell rubber to be uniformly dispersed throughout the adhesive.

The core-shell rubber may be a polymer, including conjugated dienes such as butadiene, isoprene, 1,3-pentadiene, cyclopentadiene, and dicyclopentadiene, and non-conjugated dienes such as 1,4-hexadiene and ethylidene norbornene; copolymers of these conjugated or non-conjugated dienes with aromatic vinyl compounds such as styrene, vinyl toluene, and alpha-methylstyrene, unsaturated nitrile compounds such as acrylonitrile or methacrylonitrile, or (meth) acrylates such as 2-hydroxyethyl acrylate, 2-hydroxyethyl methacrylate, 3-hydroxybutyl acrylate, glycidyl methacrylate, and butoxyethyl methacrylate; acrylic rubbers such as polybutyl acrylate; silicone rubber; or a core-shell graft copolymer having a core part comprising a rubber ingredient, such as an IPN composite rubber constituted by silicone and polyalkyl acrylate, and a shell part formed around the core part by copolymerizing a (meth)acrylate ester. Polybutadiene, a butadiene-styrene copolymer, and an acrylic/ butadiene rubber-styrene copolymer can be advantageously used for the core part, and a graft copolymer of methyl (meth)acrylate can be advantageously used as the shell part. The shell part may have a layered structure, and may be constituted by one or a plurality of layers. A combination of two or more types of core-shell rubber may be used as the core-shell rubber.

Non-limiting examples of such core-shell rubbers include a methyl methacrylate-butadiene copolymer, methyl methacrylate-butadiene-styrene copolymer, methyl methacrylate-acrylonitrile-butadiene-styrene copolymer, methyl methacrylate-acrylic rubber copolymer, methyl methacrylate-acrylic rubber-styrene copolymer, methyl methacrylate-acrylic/butadiene rubber copolymer, methyl methacrylate-acrylic/butadiene rubber-styrene copolymer, and methyl methacrylate-(acrylic/silicone IPN rubber) copolymer. A methyl methacrylate-butadiene copolymer, methyl methacrylate-butadiene-styrene copolymer, or methyl methacrylate-acrylic/butadiene rubber-styrene copolymer can be advantageously used as the core-shell rubber.

The core-shell rubber ordinarily takes the form of microparticles, with the average primary particle size (mass average particle size) generally being roughly 0.05 μm or more or roughly 0.1 μm or more, and roughly 5 μm or less or roughly 1 μm or less. In the present disclosure, the average primary particle size of the core-shell rubber is determined according to a value obtained by measuring the zeta potential particle size distribution.

An amount of core-shell rubber equivalent to roughly 1 mass % or more, roughly 2 mass % or more, or roughly 5 mass % or more, and roughly 20 mass % or less, roughly 15 mass % or less, or roughly 10 mass % or less of the thermoset adhesive can be used.

The thermally expansive microparticles are microcapsules of a shell of a gas-barrier thermoplastic resin, such as an acrylonitrile-based copolymer, encapsulating a thermal expansion agent within the shell. When the thermally expansive microparticles are heated, the thermoplastic resin of the shells softens and the volume of the thermal expansion agent increases, thereby increasing the volume of the thermoset adhesive. A substance having a low boiling point, such as trichlorofluoromethane, n-pentane, isopentane, neopentane, butane, and isobutane, is sealed within the shells as the thermal expansion agent, and the vaporization of this low boiling point substance is used to expand the thermally expansive microparticles. When the thermoset adhesive is heated so as to cure, the thermally expansive microparticles expand, increasing the volume of the adhesive. The expanded adhesive fills the gap forming between the two materials having different linear expansion coefficients as the result of the heated materials warping, thereby bonding the materials.

The expansion initiation temperature of the thermally expansive microparticles is preferably lower than the heat generation initiation temperature of the thermoset adhesive. This makes it possible to prevent the thermoset adhesive from curing before it has expanded sufficiently. The expansion initiation temperature of the thermally expansive microparticles is the temperature at which the volume of the thermally expansive microparticles changes. The expansion initiation temperature of the thermally expansive microparticles is roughly 70° C. or more, roughly 75° C. or more, or roughly 80° C. or more, and roughly 110° C. or less, roughly 105° C. or less, or roughly 100° C. or less. The expansion initiation temperature of the thermally expansive microparticles is selected according to the heat generation initiation temperature of the thermoset adhesive, the heating profile when curing the thermoset adhesive, and the like. The expansion initiation temperature can be, for example, a temperature that is less than the heat generation initiation temperature by roughly 5° C. or more.

The maximum expansion temperature of the thermally expansive microparticles is roughly 110° C. or more, and roughly 135° C. or less. For example, the maximum expansion temperature can be selected so as to fall within a range from roughly 110° C. to roughly 120° C., or from roughly 125° C. to roughly 135° C. If heating is continued in excess of the maximum expansion temperature, the gaseous thermal expansion agent will penetrate the shells of the thermally expansive microparticles, which have become thinner as the result of expansion, and diffuse externally, causing the microparticles to contract due to the tension of the shells and external pressure; thus, the maximum expansion temperature of the thermally expansive microparticles is selected according to the heat generation initiation temperature of the thermoset adhesive, the heating profile when curing the thermoset adhesive, and the like. For example, the maximum expansion temperature can be selected so as to fall into a range of roughly ±40° C. of the heat generation initiation temperature of the thermoset adhesive.

The average particle size of the thermally expansive microparticles is roughly 9 μm or more, roughly 10 μm or more, or roughly 13 μm or more, and roughly 19 μm or less, roughly 16 μm or less, or roughly 15 μm or less. In the present disclosure, the average particle size of the thermally expansive microparticles is determined by a measurement using a laser diffraction particle size distribution analyzer.

The volumetric expansion factor and quantity of the thermally expansive microparticles can be determined, as appropriate, according to the strength and bond strength required of the cured adhesive and the expansion factor required of the thermoset adhesive. For example, the volumetric expansion factor of the thermally expansive microparticles can be roughly 2× or more, roughly 3× or more, or roughly 5× or more, and roughly 20× or less, roughly 15× or less, or roughly 10× or less. An amount of thermally expansive microparticles equivalent to roughly 0.3 mass % or more, roughly 0.5 mass % or more, or roughly 1 mass % or more, and roughly 20 mass % or less, roughly 15 mass % or less, or roughly 12 mass % or less of the thermoset adhesive can be used.

A known latent curing agent generally used to cure epoxy resins is used as the curing agent for the thermoset adhesive. Latent curing agents are curing agents that do not exhibit epoxy resin-curing activity at normal temperature, but are activated and capable of curing epoxy resins when heated. For example, a conventionally known microparticle latent curing agent is insoluble in epoxy resins at normal temperature, but becomes soluble and capable of curing epoxy resins when heated. These curing agents can be used singly or in combinations of two or more according to the type of epoxy resin and the properties of the cured product. In the present disclosure, "curing agent" encompasses compounds contributing to the curing of epoxy resins, such as cure accelerators, crosslinking agents, and the like.

Examples of possible latent curing agents include dicyandiamide (DICY) and derivatives thereof, polyamine compounds such as organic acid dihydrazides, combinations of these polyamine compounds with urea compounds such as 4,4'-methylene-bis(phenyldimethyl urea), N-(2-methylphenyl)-imidodicarbonimidic diamide, hydrazide compounds, boron trifluoride-amine complexes, 2-phenyl-4,5-dihydroxymethyl imidazole and other imidazole compounds that form microparticles at normal temperature, modified polyamine compounds such as reactions products of polyamine compounds and epoxy compounds (polyamine-epoxy adducts), and reaction products of amine compounds, such as 2,4-diamino-6-[2'-methyl imidazolyl-(1')]-ethyl-s-triazine isocyanuric acid adducts, and isocyanate compounds or urea compounds (urea adducts).

An amount of curing agent equivalent to roughly 1 part by mass or more, roughly 2 parts by mass or more, or roughly 5 parts by mass or more and roughly 20 parts by mass or less, roughly 15 parts by mass or less, or 12 parts by mass or less per 100 parts by mass epoxy resin can be used, taking into account the curability of the thermoset adhesive, the heat resistance and humidity resistance of the cured product, and the like.

The thermoset adhesive may also comprise, as optional ingredients, a rheology modifier such as fumed silica; an inorganic filler such as silica, alumina, boron nitride, or glass beads; an antioxidant such as a phenol-based antioxidant or a sulfur-based antioxidant; a silane coupling agent such as an epoxy-modified alkoxysilane; a flame retardant; a coloring agent; a leveling agent; an anti-foaming agent; a solvent; or the like. The amount added of these additives can be determined, as appropriate, within a range such that the effects of the present invention are not inhibited. For example, an amount of rheology modifier equivalent to roughly 0.1 mass % or more, roughly 0.2 mass % or more, or roughly 0.5 mass % or more, and roughly 5 mass % or less, roughly 3 mass % or less, or roughly 2 mass % or less of the thermoset adhesive can be used. Likewise, for example, an amount of inorganic filler equivalent to roughly 10 mass % or more, roughly 20 mass % or more, or roughly 30 mass % or more, and roughly 70 mass % or less, roughly 60 mass % or less, or roughly 50 mass % or less of the thermoset adhesive can be used.

The thermoset adhesive can be prepared, for example, by mixing the abovementioned ingredients in a mixer while heating them as necessary, and degassing as necessary. The viscosity of the thermoset adhesive at 25° C. is generally roughly 10 Pa·s or more or roughly 50 Pa·s or more, and roughly 1,000 Pa·s or less or roughly 800 Pa·s or less. Viscosity is measured at 25° C. and a shear rate of 15.5 s-1 using a rotational viscometer.

The heat generation initiation temperature of the thermoset adhesive can be selected according to the expansion initiation temperature and/or maximum expansion temperature of the thermally expansive microparticles, as discussed above. In this context, "heat generation initiation temperature" is defined as the temperature at which the tangent line at a lower temperature at which the heat generation level is ½ the peak intersects the baseline in a DSC curve obtained when the temperature of the thermoset adhesive is raised from room temperature at a temperature gradient of 10° C./minute in differential scanning calorimetry (DSC). When differential scanning calorimetry is performed at a temperature gradient of 10° C./minute, the heat generation initiation temperature of the thermoset adhesive is roughly 80° C. or more, or roughly 90° C. or more, and roughly 150° C. or less, or roughly 140° C. or less. When differential scanning calorimetry is performed at a temperature gradient of 10° C./minute, the maximum heat generation temperature of the thermoset adhesive can be roughly 110° C. or more, or roughly 120° C. or more, and roughly 155° C. or less, or roughly 150° C. or less. The heat generation initiation temperature and maximum heat generation temperature can be adjusted via the epoxy equivalent weight of the epoxy resin and the type and quantity of the curing agent.

The thermoset adhesive of the present disclosure can couple various types of substrates to each other, including wood, metal, coated metal, plastic and filler plastic substrates, and glass fibers. The thermoset adhesive can be applied to one or both substrates to be bonded using a caulking gun or the like while being heated as necessary. Next, the two substrates are disposed so that the thermoset adhesive contacts both substrates. The thermoset adhesive is then cured while expanding from being heated, bonding the two substrates.

The two substrates being bonded may be plate-shaped members having different linear expansion coefficients. In such cases, the thermoset adhesive is applied to the surface of one or both of the two plate-shaped members, and one plate-shaped member, the thermoset adhesive, and the other plate-shaped member are layered in that order, after which heating is performed to cure the thermoset adhesive, bonding the two plate-shaped members via the cured thermoset adhesive. Gaps formed between the two plate-shaped members during heating are filled by the expanded thermoset adhesive, allowing the two plate-shaped members to be bonded without spaces being formed therebetween.

In one embodiment, one plate-shaped member contains aluminum. In another embodiment, the other plate-shaped member contains iron. Examples of iron-containing plate-shaped members include steel sheet, coated steel sheet, and zinc coated steel sheet (electrogalvanized steel sheet, hot-dip galvanized steel sheet, galvannealed steel sheet, etc.). In yet another embodiment, the one plate-shaped member contains carbon FRP.

The thermoset adhesive of the present disclosure is favorably used, for example, to bond automotive components, especially components containing aluminum and components containing iron. Mechanical joining methods such as rivets or nuts and bolts may also be used in conjunction with the thermoset adhesive of the present disclosure. An example in which the thermoset adhesive of the present disclosure can especially advantageously used is to bond an automobile ceiling part (roof) constituting an aluminum-containing automotive component and a body part to which the roof is mounted constituting an iron-containing component. The thermoset adhesive of the present disclosure can be designed to fit the heating profile for when an electrode-posited coating is cured or dried, allowing an automobile roof and body part to be coated and bonded simultaneously.

EXAMPLES

In the following working examples, specific embodiments of the present disclosure are exemplified, but the present invention is not restricted thereto. All parts and percentages are in terms of mass unless otherwise indicated.

The reagents, raw materials, and the like used in these working examples are shown below in Table 1.

TABLE 1

| Trade name | Description | Supplier |
| --- | --- | --- |
| <Epoxy resin> | | |
| YD128 | DGEBA (bisphenol A diglycidyl ether) Epoxy equivalent weight: 189 | Nippon Steel & Sumikin Chemical Co., Ltd. |
| Araldite ® DY3601 | Polypropylene glycol glycidyl ether PO units: 11-12 Epoxy equivalent weight: 385-405 | Huntsman Corporation |
| Cardura ® E10P | Glycidyl neodecanoate Reactive plasticizer Epoxy equivalent weight: 248 | Hexion Specialty Chemicals Inc. |

TABLE 1-continued

| Trade name | Description | Supplier |
|---|---|---|
| <Core-shell rubber> | | |
| KaneAce ® B-564 | Polybutadiene-poly(methyl methacrylate) core-shell rubber particles | Kaneka Corp. |
| <Filler> | | |
| M. QUARTZ Y74 | Silica filler | Marukama Ltd. |
| Shieldex ® AC3 | Ca ion-modified silica gel Anti-corrosive filler | Grace Davison |
| <Rheology modifier> | | |
| CAB-O-SIL ® TS720 | Hydrophobic fumed silica | Cabot Corporation |
| Aerosil ® RX-200 | Hydrophobic fumed silica (trimethylsilyl group-modified) Average particle size: 12 nm | Nippon Aerosil Co., Ltd. |
| <Curing agent> | | |
| Amicure ® CG-1200 | Dicyandiamide | Air products |
| Omicure ® U-52 | 4,4'-methylene-bis(phenyldimethyl urea) | CVC Specialty Chemicals Inc. |
| Fujicure ® FXR-1020 | Modified polyamine latent curing agent | T&K TOKA Corp. |
| Fujicure ® FXR-1081 | Modified polyamine latent curing agent | T&K TOKA Corp. |
| Aradur ® 2844 | N-(2-methylphenyl)-imidedicarbonimidic diamide | Huntsman Corporation |
| Curezol ® 2MA-OK | 2,4-diamino-6-[2'-methyl imidazolyl-(1')]-ethyl-s-triazine isocyanuric acid adduct | Shikoku Chemicals Corp. |
| Curezol ® 2PHZ-PW | 2-phenyl-4,5-dihydroxymethyl imidazole | Shikoku Chemicals Corp. |
| <Thermally expansive microparticles> | | |
| F-36LVD | Polyacrylonitrile-based shell Average particle size: 13-19 μm Expansion initiation temperature: 75-85° C. Maximum expansion temperature: 110-120° C. | Matsumoto Yushi Seiyaku Co., Ltd. |
| F-36D | Polyacrylonitrile-based shell Average particle size: 10-16 μm Expansion initiation temperature: 70-80° C. Maximum expansion temperature: 110-120° C. | Matsumoto Yushi Seiyaku Co., Ltd. |
| F-48D | Polyacrylonitrile-based shell Average particle size: 9-15 μm Expansion initiation temperature: 90-100° C. Maximum expansion temperature: 125-135° C. | Matsumoto Yushi Seiyaku Co., Ltd. |
| F-100MD | Polyacrylonitrile-based shell Average particle size: 17-23 μm Expansion initiation temperature: 115-125° C. Maximum expansion temperature: 155-165° C. | Matsumoto Yushi Seiyaku Co., Ltd. |
| FN-100SD | Polyacrylonitrile-based shell Average particle size: 10-20 μm Expansion initiation temperature: 125-135° C. Maximum expansion temperature: 150-160° C. | Matsumoto Yushi Seiyaku Co., Ltd. |
| FN-105D | Polyacrylonitrile-based shell Average particle size: 35-45 μm Expansion initiation temperature: 120-135° C. Maximum expansion temperature: 175-185° C. | Matsumoto Yushi Seiyaku Co., Ltd. |
| <Other> | | |
| Preton ® R303-PX2 | Lubricating anti-rust agent | Sugimura Chemical Industrial Co., Ltd. |

A thermoset adhesive was prepared as follows according to the formulation shown in Table 2. First, KaneAce® B-564 (core-shell rubber) was mixed with YD128 and either Araldite® DY3601 or Cardura® E10P (epoxy resin) in a wide-mouthed flask, which was placed in an oven and heated to 95° C. The contents of the wide-mouthed flask were mixed in a mixer at 95° C. to prepare a homogeneous dispersion. After the dispersion was cooled to room temperature, the remaining ingredients shown in table 2 apart from the CAB-O-SIL® TS720 or Aerosil® RX-200 (rheology modifier) were added and stirred in a mixer. After the dispersion reached a homogeneous consistency, the CAB-O-SIL® TS720 or Aerosil® RX-200 (rheology modifier) was added and the dispersion was stirred again. Afterwards, the dispersion was degassed for thirty minutes in a vacuum to obtain a thermoset adhesive. The obtained thermoset adhesive was used to perform the following performance evaluation tests.

TABLE 2

| | Working Example 1 | Working Example 2 | Working Example 3 | Working Example 4 | Working Example 5 | Working Example 6 | Working Example 7 | Working Example 8 | Working Example 9 |
|---|---|---|---|---|---|---|---|---|---|
| YD128 | 7.5 | 7.5 | 7.5 | 7.5 | 7.5 | 7.5 | 7.5 | 7.5 | 7.5 |
| Araldite DY3601 | 0 | 0 | 0 | 0 | 0 | 0 | 0 | 0 | 0 |
| Cardura E10P | 2.5 | 2.5 | 2.5 | 2.5 | 2.5 | 2.5 | 2.5 | 2.5 | 2.5 |
| KaneAce B-564 | 2.0 | 2.0 | 2.0 | 2.0 | 2.0 | 2.0 | 2.0 | 2.0 | 2.0 |
| M. QUARTZ Y74 | 12.0 | 12.0 | 12.0 | 12.0 | 12.0 | 12.0 | 12.0 | 12.0 | 12.0 |
| Shieldex AC3 | 0.6 | 0.6 | 0.6 | 0.6 | 0.6 | 0.6 | 0.6 | 0.6 | 0.6 |
| CAB-O-SIL TS720 | 0.3 | 0 | 0 | 0.3 | 0.3 | 0 | 0 | 0 | 0 |
| Aerosil RX-200 | 0 | 0.3 | 0.3 | 0 | 0 | 0.3 | 0.3 | 0.3 | 0.3 |
| Amicure CG-1200 | 0 | 0 | 0 | 0 | 0 | 0 | 0 | 1.0 | 1.0 |
| Omicure U-52 | 0 | 0 | 0 | 0 | 0 | 0 | 0 | 0.1 | 0.1 |
| Fujicure FXR-1020 | 1.0 | 1.0 | 0 | 1.0 | 0 | 1.0 | 0 | 0 | 0 |
| Fujicure FXR-1081 | 0 | 0 | 0 | 0 | 0 | 0 | 0 | 0 | 0 |
| Aradur 2844 | 0 | 0 | 0 | 0 | 0 | 0 | 0 | 0 | 0 |
| Curezol 2MA-OK | 0 | 0 | 1.0 | 0 | 1.0 | 0 | 1.0 | 0 | 0 |
| Curezol 2PHZ-PW | 0 | 0 | 0 | 0 | 0 | 0 | 0 | 0 | 0 |
| F-36LVD | 0.43 | 0 | 0 | 0.26 | 0.86 | 0 | 0 | 0 | 0 |
| F-36D | 0 | 0.43 | 0 | 0 | 0 | 0 | 0.86 | 2.0 | 0 |
| F-48D | 0 | 0 | 1.29 | 0 | 0 | 0.86 | 0 | 0 | 3.0 |
| F-100MD | 0 | 0 | 0 | 0 | 0 | 0 | 0 | 0 | 0 |
| FN-100SD | 0 | 0 | 0 | 0 | 0 | 0 | 0 | 0 | 0 |
| FN-105D | 0 | 0 | 0 | 0 | 0 | 0 | 0 | 0 | 0 |
| Total | 26.3 | 26.3 | 27.2 | 26.2 | 26.8 | 26.8 | 26.8 | 28.0 | 29.0 |

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|
| YD128 | 5.0 | 5.0 | 5.0 | 5.0 | 5.0 | 7.5 | 7.5 | 5.0 | 7.5 | 7.5 | 7.5 | 7.5 |
| Araldite DY3601 | 5.0 | 5.0 | 5.0 | 5.0 | 5.0 | 0 | 0 | 5.0 | 0 | 0 | 0 | 0 |
| Cardura E10P | 0 | 0 | 0 | 0 | 0 | 2.5 | 2.5 | 0 | 2.5 | 2.5 | 2.5 | 2.5 |
| KaneAce B-564 | 2.0 | 2.0 | 2.0 | 2.0 | 2.0 | 2.0 | 2.0 | 2.0 | 2.0 | 2.0 | 2.0 | 2.0 |
| M. QUARTZ Y74 | 14.0 | 14.0 | 14.0 | 14.0 | 14.0 | 12.0 | 12.0 | 14.0 | 12.0 | 12.0 | 12.0 | 12.0 |
| Shieldex AC3 | 0.6 | 0.6 | 0.6 | 0.6 | 0.6 | 0.6 | 0.6 | 0.6 | 0.6 | 0.6 | 0.6 | 0.6 |
| CAB-O-SIL TS720 | 0.3 | 0.3 | 0.3 | 0.3 | 0.3 | 0.3 | 0.3 | 0.3 | 0 | 0 | 0 | 0 |
| Aerosil RX-200 | 0 | 0 | 0 | 0 | 0 | 0 | 0 | 0 | 0.3 | 0.3 | 0.3 | 0.3 |
| Amicure CG-1200 | 0 | 0 | 0 | 0 | 0 | 0 | 0 | 0 | 0 | 0 | 0 | 1.0 |
| Omicure U-52 | 0 | 0 | 0 | 0 | 0 | 0 | 0 | 0 | 0 | 0 | 0 | 0.1 |
| Fujicure FXR-1020 | 1.0 | 0 | 0 | 0 | 0 | 1.0 | 0 | 0 | 0 | 0 | 0 | 0 |
| Fujicure FXR-1081 | 0 | 1.0 | 0 | 0 | 0 | 0 | 0 | 0 | 0 | 0 | 0 | 0 |
| Aradur 2844 | 0 | 0 | 1.0 | 0 | 0 | 0 | 0 | 0 | 0 | 0 | 0 | 0 |
| Curezol 2MA-OK | 0 | 0 | 0 | 1.0 | 0 | 0 | 1.0 | 1.0 | 1.0 | 1.0 | 1.0 | 0 |
| Curezol 2PHZ-PW | 0 | 0 | 0 | 0 | 1.0 | 0 | 0 | 0 | 0 | 0 | 0 | 0 |

TABLE 2-continued

| | | | | | | | | | | | | |
|---|---|---|---|---|---|---|---|---|---|---|---|---|
| F-36LVD | 0 | 0 | 0 | 0 | 0 | 0 | 0 | 0 | 0 | 0 | 0 | 0 |
| F-36D | 0 | 0 | 0 | 0 | 0 | 0 | 0 | 0 | 0 | 0 | 0 | 0 |
| F-48D | 0 | 0 | 0 | 0 | 0 | 0 | 0 | 0 | 0 | 0 | 0 | 0 |
| F-100MD | 0 | 0 | 0 | 0 | 0 | 0 | 0 | 0 | 0.86 | 0 | 1.72 | 0 |
| FN-100SD | 0 | 0 | 0 | 0 | 0 | 0 | 0 | 0 | 0 | 0.86 | 0 | 0 |
| FN-105D | 0 | 0 | 0 | 0 | 0 | 0 | 0 | 2.8 | 0 | 0 | 0 | 1.0 |
| Total | 27.9 | 27.9 | 27.9 | 27.9 | 27.9 | 25.9 | 25.9 | 30.7 | 26.8 | 26.8 | 27.6 | 27.0 |

("Comp. Ex." = Comparative Example)

Performance Evaluation Tests

The performance of the thermoset adhesive of the present disclosure was evaluated according to the following methods.

1. Panel Warping and Adhesive Layer Uniformity

An aluminum (Al) test panel (A6061P-T6; Nippon Light Metal Co., Ltd.; thickness 1.0 mm×width 25 mm×length 150 mm) having two nut/bolt fastening holes spaced 100 mm apart and a galvannealed steel (GA) test panel (JFE Steel Corp.; thickness 0.8 mm×width 25 mm×length 150 mm) having two similar holes were wiped using methyl ethyl ketone (MEK), then submerged in Preton® R303-PX2 and left standing for 24 hours in a perpendicular position as an anti-rust treatment. The thermoset adhesive was applied to the Al test panel using a spatula to form an adhesive layer, after which the GA test panel was placed upon the adhesive layer, and the Al test panel and GA test panel were fixed in place at two locations using nuts and bolts. In the present embodiment, a separate spacer was not used for the adhesive layer; thus, the thickness of the adhesive layer was 0.1 mm (corresponding to the maximum particle size of the added filler).

The test piece prepared as described above was heated in an over under "fast bake" and "slow bake" conditions. In "fast bake" heating, the test piece was heated from 30° C. to 190° C. at a rate of 6.4° C./minute over 25 minutes, then allowed to cool after being kept at 190° C. for 15 minutes. In "slow bake" heating, the test piece was heated from 30° C. to 70° C. over 10 minutes, kept at from 75 to 78° C. for 10 minutes, heated to 185° C. over 20 minutes at a rate of 5.4° C./minute, kept at 185° C. for 10 minutes, and allowed to cool. Both of these heating methods model electrodeposition drying conditions (temperature profiles) used in automobile manufacturing. After the adhesive layer had cured, the maximum gap between the Al test panel and the GA test panel was measured for each test piece. The maximum gap was observed roughly halfway between the two nut/bolt fastenings. The GA test panel was then pulled off the Al test panel, and the uniformity of the adhesive layer was visually observed and rated according to one of three grades: A indicating the gap between the test panels being completely filled, with no spaces therebetween; B indicating the presence of partially unfilled sections within permissible limits; and C indicating an unusable product.

2. Overlap Shear (OLS) Test

The tip (10 mm from the end) of an aluminum (Al) test panel (A6061P-T6; Nippon Light Metal Co., Ltd.; thickness 1.0 mm×width 25 mm×length 150 mm) was wiped with methyl ethyl ketone (MEK), submerged in Preton® R303-PX2, and left standing for 24 hours in a perpendicular position as an anti-rust treatment. The thermoset adhesive was applied to the Al test panel using a spatula to form an adhesive layer, and a separate Al test panel subjected to an anti-rust treatment using Preton® R303-PX2 was placed upon the adhesive layer with an overlap of 10 mm and clamped in place using a clip. In the present embodiment, a separate spacer was not used for the adhesive layer; thus, the thickness of the adhesive layer was 0.1 mm (corresponding to the maximum particle size of the added filler). The test piece prepared as described above was heated in an over under "fast bake" and "slow bake" conditions. After the adhesive layer had cured, a test was performed using a Tensilon testing apparatus in tensile mode at a crosshead speed of 5 mm/minute.

3. T-Peel Test

An aluminum (Al) test panel (A6061P-T6; Nippon Light Metal Co., Ltd.; thickness 1.0 mm×width 25 mm×length 150 mm) was wiped with methyl ethyl ketone (MEK), submerged in Preton® R303-PX2, and left standing for 24 hours in a perpendicular position as an anti-rust treatment. The thermoset adhesive was applied to the Al test panel using a spatula to form an adhesive layer, and a separate Al test panel subjected to an anti-rust treatment using Preton® R303-PX2 was placed upon the adhesive layer and clamped in place using a clip. In the present embodiment, a separate spacer was not used for the adhesive layer; thus, the thickness of the adhesive layer was 0.1 mm (corresponding to the maximum particle size of the added filler). The test piece prepared as described above was heated in an over under "fast bake" and "slow bake" conditions. After the adhesive layer had cured, a test was performed using a Tensilon testing apparatus in T-peel mode at a peel rate of 200 mm/minute.

4. DSC (Differential Scanning Calorimetry)

Roughly from 2 to 10 mg of a thermoset adhesive specimen was introduced into an aluminum pan and analyzed using a Perkin Elmer Pyris 1 differential scanning calorimeter to determine heat generation initiation temperature and maximum heat generation temperature.

Test results are summarized in table 3.

TABLE 3

| | Working Example 1 | Working Example 2 | Working Example 3 | Working Example 4 | Working Example 5 | Working Example 6 | Working Example 7 | Working Example 8 | Working Example 9 |
|---|---|---|---|---|---|---|---|---|---|
| Fast bake | | | | | | | | | |
| Max. gap (mm) | 0.4 | 0.6 | 0.7 | 0.5 | 0.6 | 0.5 | 0.7 | 0.7 | 0.7 |
| Filling of gap by adhesive post curing | A | A | A | B | A | A | A | A | A |

TABLE 3-continued

| | | | | | | | | | |
|---|---|---|---|---|---|---|---|---|---|
| OLS [MPa] | 14.1 (CF) | 9.5 (CF) | 12.0 (CF) | 21.0 (CF) | 14.0 (CF) | 7.9 (CF) | 10.1 (CF) | 13.2 (CF) | 15.4 (CF) |
| T peel [N/25 mm] | 32.8 (CF) | 21.8 (CF) | 33.6 (CF) | 47.1 (CF) | 41.4 (CF) | 21.3 (CF) | 29.0 (CF) | 13.1 (CF) | 25.3 (CF) |
| Slow bake | | | | | | | | | |
| Max. gap [mm] | 0.3 | 0.4 | 0.7 | | 0.6 | 0.6 | 0.9 | 1.0 | 0.9 |
| Filling of gap by adhesive post curing | A | A | A | | C | C | C | C | C |
| OLS [MPa]*⁾ | 14.0 (CF) | 9.0 (CF) | 10.9 (CF) | | 12.8 (CF) | 8.3 (CF) | 9.5 (CF) | 10.8 (CF) | 11.3 (CF) |
| T peel [N/25 mm] | 52.7 (CF) | 27.4 (CF) | 40.2 (CF) | | 29.4 (CF) | 20.3 (CF) | 21.9 (CF) | 22.8 (CF) | 18.4 (CF) |
| DSC | | | | | | | | | |
| Heat generation initiation temperature (° C.) | 100 | 100 | 149 | 100 | 146 | 100 | 148 | 155 | 155 |
| Maximum heat generation temperature (° C.) | 125 | 124 | 152 | 130 | 150 | 119 | 152 | 179 | 176 |

*⁾In the table, CF signifies cohesive failure, and TCF signifies thin-layer failure.
("Comp. Ex." = Comparative Example)

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|
| Fast bake | | | | | | | | | | | | |
| Max. gap (mm) | 0.4 | 0.4 | 0.8 | 0.6 | 0.8 | 0.4 | 0.5 | 1.5 | 0.62 | 0.9 | 0.9 | 1.1 |
| Filling of gap by adhesive post curing | C | C | C | C | C | C | C | C | C | C | C | C |
| OLS [MPa] | | | | | | | | | | | | |
| T peel (N/25 mm) | | | | | | | | | | | | |
| Slow bake | | | | | | | | | | | | |
| Max. gap (mm) | | | | | | | | | | | | |
| Filling of gap by adhesive post curing | | | | | | | | | | | | |
| OLS [MPa]*⁾ | | | | | | | | | | | | |
| T peel (N/25 mm) | | | | | | | | | | | | |
| DSC | | | | | | | | | | | | |
| Heat generation initiation temperature (° C.) | 96 | 94 | 133 | 150 | 176 | 97 | 147 | 152 | 149 | 148 | 147 | 156 |
| Maximum heat generation temperature (° C.) | 121 | 117 | 169 | 155 | 179 | 123 | 151 | 156 | 151 | 151 | 151 | 171 |

*⁾In the table, CF signifies cohesive failure, and TCF signifies thin-layer cohesive failure.

What is claimed is:

1. A component comprising:
    a first plate-shaped member,
    a second plate-shaped member, and
    a cured thermoset adhesive disposed between the first plate-shaped member and the second plate-shaped member and bonding together the first plate-shaped member and the second plate-shaped member,
    wherein the first plate-shaped member has a linear expansion coefficient different from a linear expansion coefficient of the second plate-shaped member, and the thermoset adhesive comprises an epoxy resin, a core-shell rubber, thermally expansive microparticles, and a hardening agent, with the thermally expansive microparticles having an average particle size of from 9 to 19 µm, an expansion initiation temperature of from 70 to 100° C., and a maximum expansion temperature of from 110 to 135° C.

2. The component according to claim 1, wherein the thermoset adhesive has a heat generation initiation temperature of 150° C. or less, and a maximum heat generation temperature of 155° C. or less, when differential scanning calorimetry is performed at a temperature gradient of 10° C./minute.

3. The component according to claim 2, wherein the first plate-shaped member contains aluminum.

4. The component according to claim 3, wherein the second plate-shaped member contains iron.

5. The component according to claim 2, wherein the second plate-shaped member contains iron.

6. The component according to claim 1, wherein the thermoset adhesive comprises an amount of thermally expansive microparticles equivalent to about 0.3 mass % or more of the thermoset adhesive.

7. The component according to claim 6, wherein the thermoset adhesive comprises an amount of thermally expansive microparticles equivalent to about 20 mass % or less of the thermoset adhesive.

8. The component according to claim 6, wherein the thermoset adhesive comprises an amount of thermally expansive microparticles equivalent to about 15 mass % or less of the thermoset adhesive.

9. The component according to claim 6, wherein the thermoset adhesive comprises an amount of thermally expansive microparticles equivalent to about 12 mass % or less of the thermoset adhesive.

10. The component according to claim 1, wherein the thermally expansive microparticles of the thermoset adhesive exhibit a volumetric expansion factor of about 2× or more.

11. The component according to claim 10, wherein the thermally expansive microparticles of the thermoset adhesive exhibit a volumetric expansion factor of about 20× or less.

12. The component according to claim 10, wherein the thermally expansive microparticles of the thermoset adhesive exhibit a volumetric expansion factor of about 15× or less.

13. The component according to claim 10, wherein the thermally expansive microparticles of the thermoset adhesive exhibit a volumetric expansion factor of about 10× or less.

14. The component according to claim 1, wherein the thermoset adhesive has a viscosity, measured at 25° C. and a shear rate of 15.5 s$^{-1}$ using a rotational viscometer, in the range of from about generally roughly 10 Pa·s up to about 1,000 Pa s.

15. The component according to claim 1, wherein the first plate-shaped member contains aluminum.

16. The component according to claim 15, wherein the second plate-shaped member contains iron.

17. The component according to claim 1, wherein the second plate-shaped member contains iron.

18. The component according to claim 1, wherein said component is an automotive component.

* * * * *